(12) United States Patent
Ikeda et al.

(10) Patent No.: US 7,167,449 B2
(45) Date of Patent: Jan. 23, 2007

(54) COMMUNICATION TERMINAL DEVICE, METHOD, PROGRAM, RECORDING MEDIUM, AND INTEGRATED CIRCUIT FOR USE IN COMMUNICATION NETWORK SYSTEM

(75) Inventors: Koji Ikeda, Kadoma (JP); Akio Kurobe, Tondabayashi (JP); Gou Kuroda, Izumisano (JP); Kensuke Yoshizawa, Osaka (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 441 days.

(21) Appl. No.: 10/844,492

(22) Filed: May 13, 2004

(65) Prior Publication Data

US 2004/0240453 A1 Dec. 2, 2004

(30) Foreign Application Priority Data

May 16, 2003 (JP) .............................. 2003-139360

(51) Int. Cl.
*G01R 31/08* (2006.01)
*H04J 3/16* (2006.01)

(52) U.S. Cl. ....................................... 370/235; 370/465
(58) Field of Classification Search ...................... None
See application file for complete search history.

(56) References Cited

U.S. PATENT DOCUMENTS 5,652,749 A * 7/1997 Davenport et al. ......... 370/466

| | | | |
|---|---|---|---|
| 6,185,568 B1 | 2/2001 | Douceur et al. | |
| 6,438,123 B1 | 8/2002 | Chapman | |
| 2002/0196787 A1 | 12/2002 | Rajan et al. | |
| 2006/0120400 A1* | 6/2006 | Fukuoka et al. ............ | 370/447 |

FOREIGN PATENT DOCUMENTS

JP 7-123118 5/1995

OTHER PUBLICATIONS

ANSI/IEEE Std. 802.11, ISO/IEC 8802-11: 1999(E), Local and Metropolitan Area Networks: Wireless Lan pp. 34-58 & 195-223.

* cited by examiner

*Primary Examiner*—Duc Ho
(74) *Attorney, Agent, or Firm*—Wenderoth, Lind & Ponack, L.L.P.

(57) ABSTRACT

A communication terminal device of the present invention includes: a packet classification section 103 for classifying the packets by stream types and destinations; a packet accumulation section 104–107 for accumulating the packets classified by the packet classification section, so as to be separately stored based on classification by the stream types and the destinations; a QoS control section 113 for determining a transmission start requirement based on a QoS parameter which defines a transmission quality of a stream; a transmission control section 108 for determining whether the transmission start requirement is satisfied; a framing section 109 for generating the frame by concatenating the packets accumulated in the packet accumulation section if it is determined by the transmission control section that the transmission start requirement is satisfied; and a transmission section 110 for transmitting the frame generated by the framing section to a destination communication terminal device.

20 Claims, 7 Drawing Sheets

COMMUNICATION TERMINAL DEVICE, METHOD, PROGRAM, RECORDING MEDIUM, AND INTEGRATED CIRCUIT FOR USE IN COMMUNICATION NETWORK SYSTEM

BACKGROUND OF THE INVENTION

1. Field of the Invention

The present invention relates to a communication terminal device for transmitting and receiving frames in a communication network system, and more particularly to a communication terminal device for transmitting and receiving frames each containing a plurality of packets.

2. Description of the Background Art

In a conventional communication network system where frames are transmitted and received between a plurality of communication terminal devices, data transmission is conducted by transmitting a frame, which contains a set of header information, data, and frame check sequence information, from a communication terminal device to a reception terminal device (see pages 34 and 199–205 of ANSI/IEEE Std802.11, ISO/IEC 8802–11:1999(E)).

Figure 9:
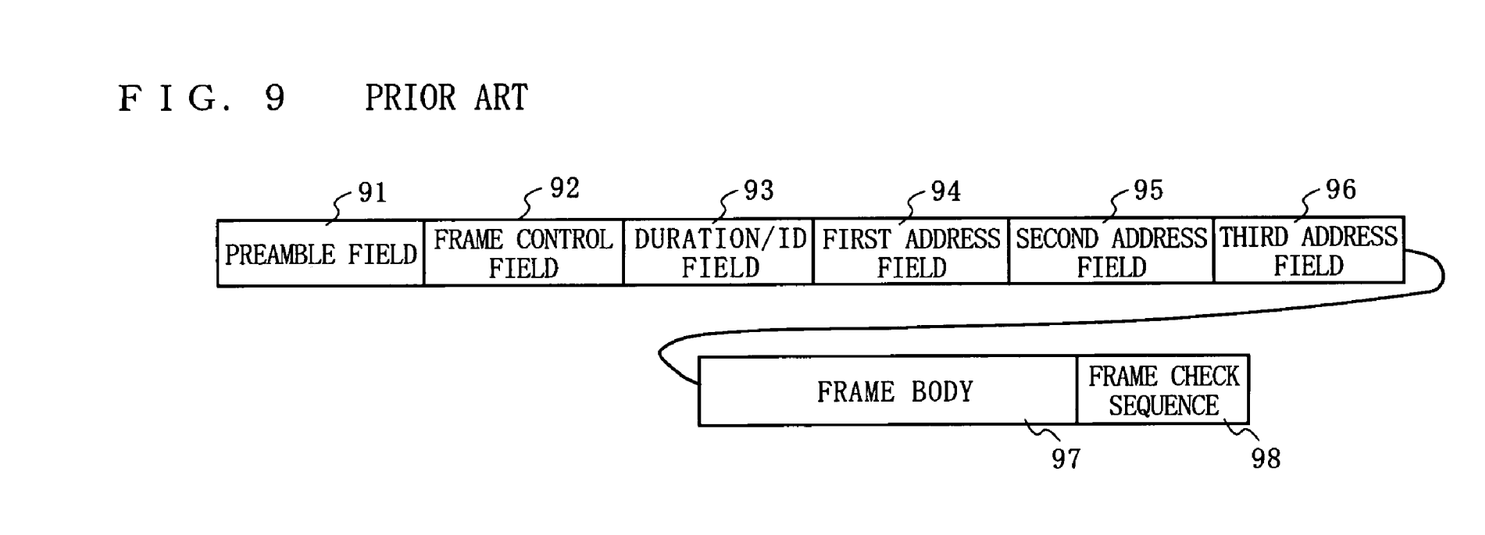
FIG. 9 is a diagram showing a conventional frame structure.

FIG. 9 is a diagram showing a conventional frame structure disclosed in ANSI/IEEE Std802.11, ISO/IEC 8802–11: 1999(E). In FIG. 9, a frame includes a preamble field 91, a frame control field 92, a duration/ID field 93, a first address field 94, a second address field 95, a third address field 96, a frame body field 97, and a frame check sequence field 98.

The preamble field 91 contains information used for establishing frame synchronization. The frame control field 92 contains a frame type, etc. The duration/ID field 93 contains information related to a length of time for which a communication medium is occupied for transmitting the frame. The first address field 94 contains a destination terminal device address indicating an address of a terminal device, which receives the frame, among terminal devices which directly transmit/receive the frame. The second address field 95 contains a source terminal device address indicating an address of a terminal device, which transmits the frame, among the terminal devices which directly transmit/receive the frame. The third address field 96 contains a source address indicating an address of a terminal device from which the frame was originally transmitted, and a destination address indicating an address of a terminal device which is a final destination of the frame. The frame body field 97 contains a sequence number, cryptographic information, and data. The frame check sequence 98 contains information used for detecting whether the frame has an error.

In the frame shown in FIG. 9, the preamble field 91, the frame control field 92, and the duration/ID field 93 are transmitted at a lowest possible speed using a modulation technique, which provides high redundancy, so as to be recognized by all terminal devices on the communication network. Other fields (hereinafter, correctively referred to as a "data field") are transmitted at high speed using a modulation technique suitable for a communication status between communicating terminal devices.

As described above, the preamble field 91, the frame control field 92, and the duration/ID field 93 are transmitted at a lowest possible transmission rate, while the data field is transmitted at a high transmission rate. However, if the transmission rate of the data field is considerably high, overhead due to transmission of the preamble field 91, the frame control field 92, and the duration/Id field 93 is increased. Accordingly, an effective transmission rate is reduced.

For example, consider a case where a working bandwidth and the data transmission rate are quadrupled in a system which conforms to the IEEE802.11a standard and uses the 5 GHz band. It is assumed that a 1500 byte data field is transmitted as an Ethernet(R) packet. In this case, it requires 24 microseconds (μsec) to transmit the preamble field 91, the frame control field 92, and the duration/ID field 93. Further, it requires 56 μsec to transmit the data field. Accordingly, 56 μsec/(24 μsec+56 μsec)=0.7, and therefore a transmission efficiency for the data field is reduced to 70%. Moreover, in the case of using an access control system, such as CSMA/CD, it is necessary to insert a gap between frames to be transmitted, so that the transmission efficiency is reduced to 40% or lower on average.

In order to solve the problem as described above, Japanese Patent Laid-Open Publication No. 7-123118 proposes a frame transmission circuit. This frame transmission circuit transmits transmission frames each containing a plurality of packets, thereby increasing the transmission efficiency.

The frame transmission circuit proposed by Japanese Patent Laid-Open Publication No. 7-123118 is applicable to a case of transmitting only data packets. However, this frame transmission circuit is not able to satisfy quality of service (QoS) requirements, e.g., a maximum delay time, jitter prevention, etc., required by an AV stream, such as an audio packet (e.g., a VoIP packet) or a video packet (e.g., an MPEG packet), to be satisfied, and therefore is not applicable to a case of transmitting the AV stream.

Further, in the case of using radio or a power line as a communication medium, a frame error rate is increased from 0.1% to approximately 1.0%, and therefore if a terminal device on the reception side detects an error using forward error correction (FEC), a terminal device on the transmission side might be frequently required to retransmit frames. However, retransmission in units of frames impairs a retransmission efficiency, and therefore it is not possible to increase throughput. In order to solve this problem, retransmission in units of packets is conceivable. However, if the frame contains variable-length packets, it is difficult to specify the location of a packet, and therefore it is difficult to detect an error for each packet.

SUMMARY OF THE INVENTION

Therefore, an object of the present invention is to provide a communication terminal device capable of increasing a transmission efficiency as well as of satisfying transmission quality requirements.

The present invention has the following features to attain the object mentioned above.

A first aspect of the present invention is directed to a communication terminal device for generating a frame by concatenating a plurality of packets obtained from streams, and for transmitting the generated frame, and the device includes: a packet classification section for classifying the packets by stream types and destinations; a packet accumulation section for accumulating the packets classified by the packet classification section, so as to be separately stored based on classification by the stream types and the destinations; a QoS control section for determining a transmission start requirement based on a QoS parameter which defines a transmission quality of a stream; a transmission control section for determining whether the transmission start requirement is satisfied; a framing section for generating the frame by concatenating the packets accumulated in the packet accumulation section if it is determined by the transmission control section that the transmission start requirement is satisfied; and a transmission section for transmitting the frame generated by the framing section to a destination communication terminal device.

In the communication terminal device according to the first aspect of the present invention, the packets are classified by stream types and destinations, the classified packets are separately stored based on classification by the stream types and the destinations, and after the packets are accumulated to such an extent as to satisfy transmission quality requirements for the stream, a frame generated by concatenating the accumulated packets is transmitted. Since the generated frame includes a plurality of concatenated packets, a transmission efficiency is increased. Moreover, the frame is generated before the transmission quality requirements fail to be satisfied, and therefore QoS requirements are satisfied. Thus, it is possible to provide a communication terminal device capable of increasing a transmission efficiency as well as of satisfying the transmission quality requirements.

Preferably, the transmission start requirement determined by the QoS control section is as to whether a predetermined maximum concatenation number of packets are accumulated in the packet accumulation section.

Thus, a maximum possible number of packets can be concatenated together, whereby it is possible to increase the transmission efficiency and thereby to satisfy the transmission quality requirements.

Preferably, the communication terminal device further includes a maximum concatenation number change section for changing the maximum concatenation number, the transmission line for transmitting the frame is a power line, and if a cyclic power noise occurs on the power line, the maximum concatenation number change section changes the maximum concatenation number to a number of packets which can be transmitted within a time period in which a quantity of the cyclic power noise is less than a predetermined value.

Thus, even if the cyclic power noise occurs, the frame is transmitted within a time period for which the influence of the cyclic power noise is substantially harmless, and therefore it is possible to ensure that the frame reaches the reception side, thereby increasing the transmission efficiency.

For example, in the case where the maximum concatenation number is N, the time period in which the quantity of the cyclic power noise is less than the predetermined value is R, a redundant time period, which is obtained by excluding a time period of data from a total time period required for transmitting one frame, is V, and a time period, which corresponds to a portion of a transmission frame and is required for transmitting data corresponding to a single packet, is W, the maximum concatenation number change section may set the maximum concatenation number so as to be a value equal to or less than a maximum integer which does not exceed $(R-V)/W$.

Thus, the communication terminal device is able to obtain the number of packets to be concatenated within the time period for which the influence of the cyclic power noise is substantially harmless.

Preferably, the transmission start requirement determined by the QoS control section is as to whether the packets are accumulated into the packet accumulation section within a predetermined maximum delay time.

Thus, the communication terminal device can delay packet transmission as much as possible, whereby it is possible to increase the transmission efficiency and thereby to satisfy the transmission quality requirements.

For example, the communication terminal device may further includes a counter which indicates a current time, the packet accumulation section adds the current time indicated by the counter to each packet to be accumulated, and the transmission control section determines whether a difference between the current time indicated by the counter and a time added to an earliest packet accumulated in the packet accumulation section exceeds the maximum delay time, thereby determining whether the packets are accumulated into the packet accumulation section within the maximum delay time.

Thus, the communication terminal device can calculate a delay time.

For example, the maximum concatenation number and/or the maximum delay time may be calculated by the QoS control section based on the QoS parameter and a status of the transmission line.

For example, the maximum concatenation number and/or the maximum delay time may be calculated by an external QoS controller based on the QoS parameter and a status of the transmission line.

For example, the maximum concatenation number may be calculated by an external QoS controller based on the QoS parameter and a status of the transmission line.

Thus, the maximum concatenation number and/or the maximum delay time is/are determined with consideration of the current status of the transmission path.

For example, the QoS parameter may be any one of a maximum tolerable delay time, a maximum tolerable jitter, a maximum transmission rate, a minimum transmission rate, a maximum continuous transmission time, and a maximum transmission suspension time.

Preferably, the communication terminal device may further include: a reception section for receiving a frame transmitted from a transmission side communication terminal device; an error detection section for detecting errors in packets contained in the frame received by the reception section; and a retransmission request section for requesting the transmission side communication terminal device to retransmit an earliest packet determined by the error detection section as having an error and all packets following the earliest packet.

Thus, it is possible to retransmit a packet determined as having an error and all packets following that packet.

For example, the framing section may add to each packet an error detection code, location information about a location of the packet in the frame, and a synchronization flag, thereby generating the frame.

Preferably, the communication terminal device may further include: a reception section for receiving a frame transmitted from a transmission side communication terminal device; an error detection section for detecting errors in packets contained in the frame received by the reception section; and a retransmission request section for requesting the transmission side communication terminal device to retransmit any packet determined by the error detection section as having an error.

Thus, it is possible to retransmit only a packet determined as having an error, i.e., selective packet retransmission is possible, whereby it is possible to increase throughput.

For example, the framing section may add to each packet an error detection code, location information about a location of the packet in the frame, and a synchronization flag, thereby generating the frame.

For example, the packets may be Ethernet (R) frames.

For example, the packets may be MPEG-TS packets.

Thus, it is possible to provide a communication terminal device of the present invention without making any system change to the upper layer.

A second aspect of the present invention is directed to a method for generating a frame by concatenating a plurality of packets obtained from streams, and for transmitting the generated frame, and the method includes the steps of: classifying the packets by stream types and destinations; accumulating the classified packets so as to be separately stored based on classification by the stream types and the destinations; determining a transmission start requirement based on a QoS parameter which defines a transmission quality of a stream; determining whether the transmission start requirement is satisfied; generating the frame by concatenating the packets accumulated in the packet accumulation section if it is determined that the transmission start requirement is satisfied; and transmitting the generated frame to its destination.

A third aspect of the present invention is directed to a program causing a computer to generate a frame by concatenating a plurality of packets obtained from streams, and to transmit the generated frame, and the program causes the computer to implement the steps of: classifying the packets by stream types and destinations; accumulating the classified packets so as to be separately stored based on classification by the stream types and the destinations; determining a transmission start requirement based on a QoS parameter which defines a transmission quality of a stream; determining whether the transmission start requirement is satisfied; generating the frame by concatenating the packets accumulated in the packet accumulation section if it is determined that the transmission start requirement is satisfied; and transmitting the generated frame to its destination.

A fourth aspect of the present invention is directed to a computer-readable recording medium having stored therein a program causing a computer to generate a frame by concatenating a plurality of packets obtained from streams, and to transmit the generated frame, and the program causes the computer to implement the steps of: classifying the packets by stream types and destinations; accumulating the classified packets so as to be separately stored based on classification by the stream types and the destinations; determining a transmission start requirement based on a QoS parameter which defines a transmission quality of a stream; determining whether the transmission start requirement is satisfied; generating the frame by concatenating the packets accumulated in the packet accumulation section if it is determined that the transmission start requirement is satisfied; and transmitting the generated frame to its destination.

A fifth aspect of the present invention is directed to an integrated circuit for generating a frame by concatenating a plurality of packets obtained from streams, and the circuit includes: a packet classification section for classifying the packets by stream types and destinations; a packet accumulation section for accumulating the packets classified by the packet classification section, so as to be separately stored based on classification by the stream types and the destinations; a QoS control section for determining a transmission start requirement based on a QoS parameter which defines a transmission quality of a stream; a transmission control section for determining whether the transmission start requirement is satisfied; and a framing section for generating the frame by concatenating the packets accumulated in the packet accumulation section if it is determined by the transmission control section that the transmission start requirement is satisfied.

These and other objects, features, aspects and advantages of the present invention will become more apparent from the following detailed description of the present invention when taken in conjunction with the accompanying drawings.

DESCRIPTION OF THE PREFERRED EMBODIMENTS (First Embodiment)

Figure 1:
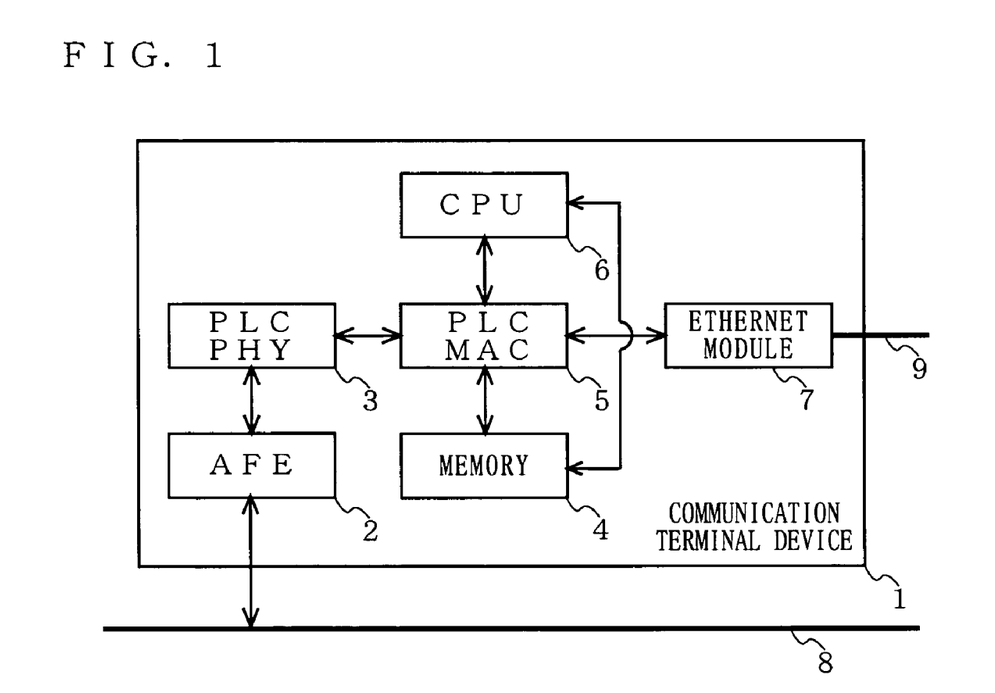
FIG. 1 is a block diagram illustrating a hardware structure of a communication terminal device according to a first embodiment of the present invention.

FIG. 1 is a block diagram illustrating a hardware structure of a communication terminal device according to a first embodiment of the present invention. In FIG. 1, a communication terminal device 1 includes an analog front end (AFE) 2, a power line communication physical layer (PLC PHY) 3, a memory 4, a power line communication media access control (PLC MAC) 5, a CPU 6, and an Ethernet module 7. The analog front end 2 is connected to a power line 8. The Ethernet module 7 is connected to an Ethernet cable 9.

The analog front end 2 performs A/D conversion, D/A conversion, automatic gain control (AGC), and coupling. The power line communication physical layer 3 performs sampling, modulation, demodulation, and forward error correction (FEC) processing. The memory 4 has stored therein a program, which implements processing procedures of the present invention, and transmission and reception data. The power line communication MAC layer 5 performs framing, addition of a cyclic redundancy check (CRC) code, CRC checking, transmission control, reception processing, and retransmission control. The CPU 6 performs QoS processing and controls an interface to an upper layer. The Ethernet module 7 transmits and receives data to/from an Ethernet (R) network.

Figure 2:
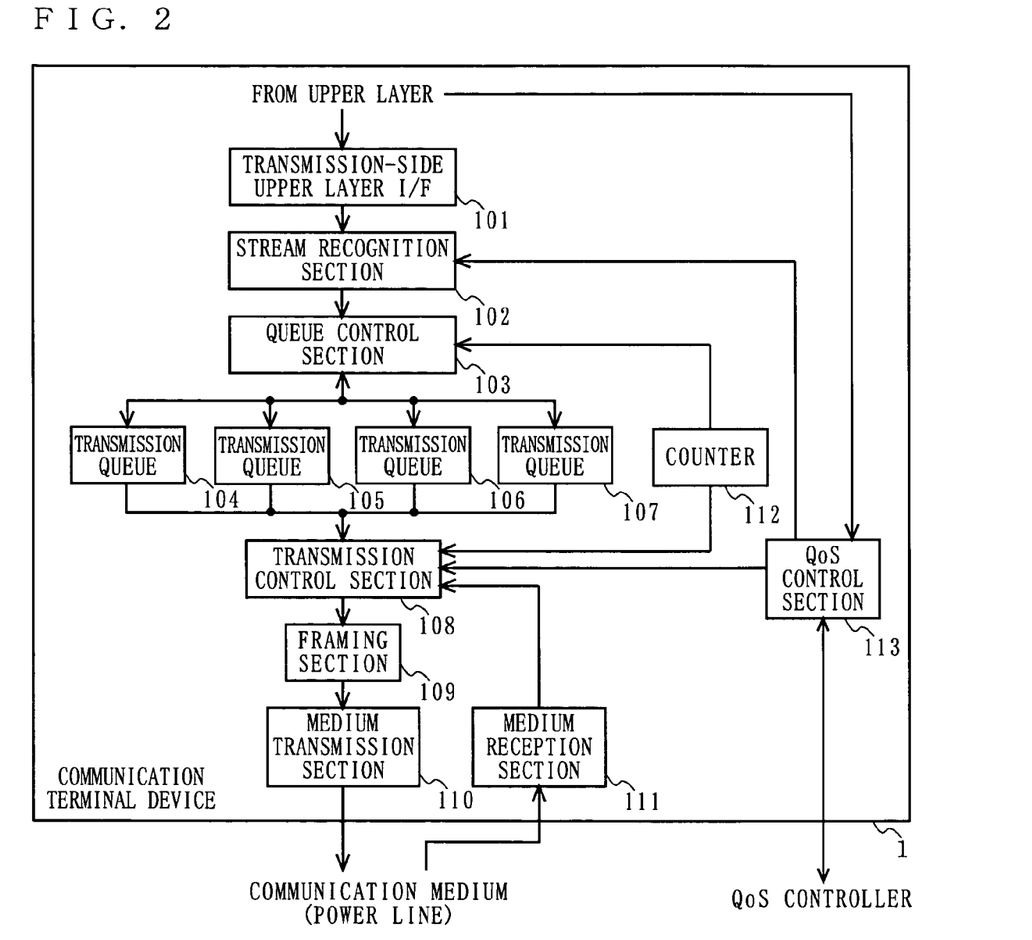
FIG. 2 is a block diagram illustrating a functional structure of a transmission side communication terminal device according to the first embodiment of the present invention.

FIG. 2 is a block diagram illustrating a functional structure of the communication terminal device 1 on the transmission side (hereinafter, referred to as a "transmission side communication terminal device"). In FIG. 2, the transmission side communication terminal device includes a transmission-side upper layer interface (I/F) 101, a stream recognition section 102, a queue control section 103, transmission queues 104, 105, 106, and 107, a transmission control section 108, a framing section 109, a medium transmission section 110, a medium reception section 111, a counter 112, and a QoS control section 113. Although four transmission queues are shown in FIG. 2, the number of the transmission queues is not limited to four.

Figure 3:
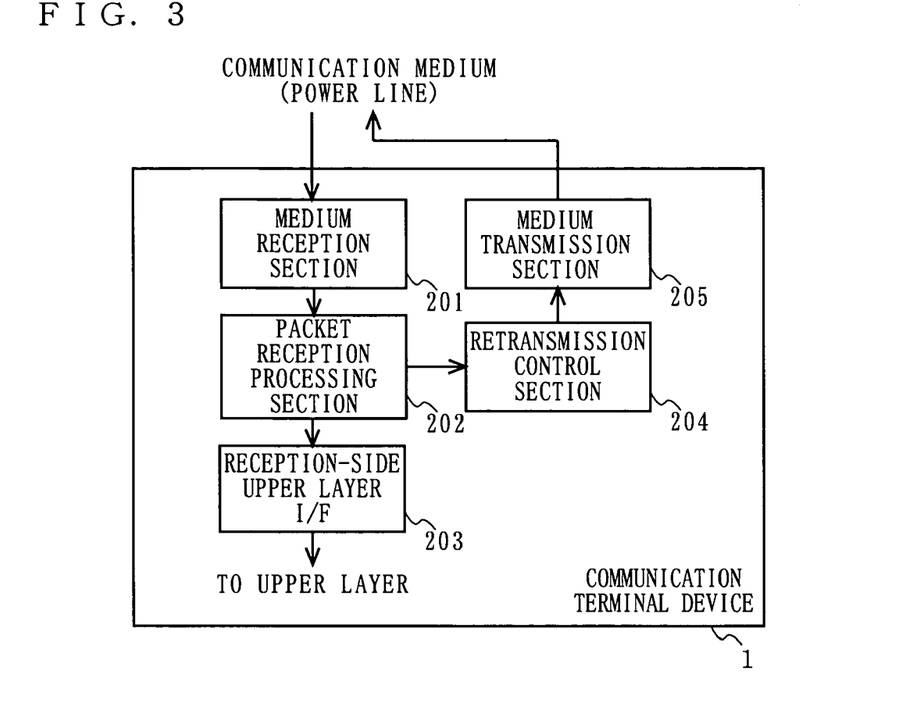
FIG. 3 is a block diagram illustrating a functional structure of a reception side communication terminal device according to the first embodiment of the present invention.

FIG. 3 is a block diagram illustrating a functional structure of the communication terminal device 1 on the reception side (hereinafter, referred to as a "reception side communication terminal device"). In FIG. 3, the reception side communication terminal device includes a medium reception section 201, a packet reception processing section 202, a reception-side upper layer interface (I/F) 203, a retransmission control section 204, and a medium transmission section 205.

In the transmission side communication terminal device shown in FIG. 2, the medium transmission section 110 and the medium reception section 111 are realized by the analog front end 2 and the power line communication physical section 3, respectively. The transmission control section 108, the framing section 109, and the counter 112 are realized by the power line communication MAC layer 5. The transmission queues 104, 105, 106, and 107 are realized by the memory 4. The transmission-side upper layer I/F 101, the stream recognition section 102, the queue control section 103, and the QoS control section 113 are realized by the CPU 6. Note that the stream recognition section 102 may be realized as a hardware filtering circuit by the power line communication MAC layer 5.

In the reception side communication terminal shown in FIG. 3, the medium reception section 201 and the medium transmission section 205 are realized by the analog front end 2 and the power line communication physical section 3, respectively. The packet reception processing section 202 and the retransmission control section 204 are realized by the power line communication MAC layer 5. The reception-side upper layer I/F 203 is realized by the CPU 6.

The transmission side communication terminal device and the reception side communication terminal device are connected together via a power line as a communication medium, so as to be able to communicate with each other. Further, each communication terminal device 1 is connected to a QoS controller present on the communication medium, i.e., the power line, so as to be able to communicate with the QoS controller via the power line.

In FIG. 2, the transmission-side upper layer I/F 101 receives transmission packets from the upper layer. The transmission packets are contained in, for example, Ethernet (R) frames or MPEG-TS packets. The stream recognition section 102 determines stream types of the transmission packets, and adds a stream number to each packet. The queue control section 103 classifies the transmission packets by stream types and destinations, and controls storage of the classified packets into the transmission queues 104, 105, 106, and 107. The transmission queues 104, 105, 106, and 107 accumulate the transmission packets. The transmission control section 108 retrieves packets from the transmission queues 104, 105, 106, and 107 and passes the retrieved packets to the framing section 109 in accordance with an accumulation status of the transmission packets into the transmission queues 104, 105, 106, and 107. The framing section 109 adds a preamble and a frame control to the head of a series of packets from the transmission control section 108, adds synchronization information to the head of each packet, and adds an error detection code to the end of each packet, thereby constructing a frame. The medium transmission section 110 transmits the frame derived from the framing section 109 to the reception side communication terminal device via the communication medium. The medium reception section 111 receives a retransmission request from the reception side communication terminal device. The counter 112 indicates the current time. The QoS control section 113 determines transmission start requirements based on a QoS parameter.

In FIG. 3, the medium reception section 201 receives a frame from the communication medium. The packet reception processing section 202 extracts individual packets from the frame. The retransmission control section 204 generates the retransmission request. The medium transmission section 205 transmits the retransmission request to the transmission side communication terminal. The reception-side upper layer I/F 203 passes a reception packet to the upper layer.

Note that although the present embodiment uses the power line as the communication medium, the communication medium may be provided in the form of a wire, e.g., an Ethernet cable, an IEEE 1394 cable, a USB cable, an ADSL cable, or a Home PNA cable, or may be provided in a wireless form using, for example, an IEEE802.11a/b/g/n, wideband orthogonal frequency division multiplexing (WOFDM) technique, or an ultra wideband (UWB) technique.

Described below is an operation of the communication terminal device 1 of the present invention.

Firstly, initial setting to be performed prior to communication is described. The QoS control section 113 acquires stream recognition information and a QoS parameter which are contained in a packet transmitted from an application in the upper layer (hereinafter, referred to as an "upper layer application"). The stream recognition information contains a stream number uniquely assigned to the stream, a source address of the packet, a destination address of the packet, a protocol, such as a user datagram protocol (UDP) or a transmission control protocol (TCP) used for an IP packet, a type of service (TOS) field, a virtual local area network (VLAN) tag, a port number, asynchronous and synchronous period information related to a USB packet and an IEEE 1394 packet, etc. The QoS parameter indicates quality requirements required for stream transmission (hereinafter, referred to as "transmission quality requirements"), and is defined for each stream. The QoS parameter contains any one of a maximum tolerable delay time, a maximum tolerable jitter, a maximum transmission rate, a minimum transmission rate, a maximum continuous transmission time, and a maximum transmission suspension time.

In order to transmit a frame, the QoS control section 113 calculates a necessary bandwidth based on the QoS parameter, with consideration of a transmission time, transmission intervals, and a transmission rate, which are required for transmitting the frame. Then, the QoS control section 113 requests the QoS controller to assign the necessary bandwidth to the communication terminal device 1. In response to this, the QoS controller assigns a bandwidth to the communication terminal device 1 such that the requirements are satisfied as much as possible. The QoS controller returns resource use permission information related to the actually assigned bandwidth to the communication terminal device 1. The resource use permission information designates a transmission start time, a transmission permitted period, an available frequency, etc., which are obtained based on the assigned bandwidth. The QoS control section 113 calculates a net maximum concatenation number Nb and a net maximum delay time Tb based on the QoS parameter and the resource use permission information received from the QoS controller, and passes the net maximum concatenation number Nb and the net maximum delay time Tb to the stream recognition section 102. The net maximum concatenation number Nb and the net maximum delay time Tb are included in the transmission start requirements. Since the QoS parameter is defined for each stream, the net maximum concatenation number Nb and the net maximum delay time Tb are also defined for each stream. In this manner, the initial setting for communication is completed.

Next, a data transmission operation is described. Firstly, the transmission-side upper layer I/F 101 receives a transmission packet from the upper layer. It is assumed that a destination address of the transmission packet is designated. The transmission packet may be an Ethernet frame, an MPEG1 packet, an MPEG2 PS/TS packet, an MPEG4 packet, an adaptive differential pulse code modulation (AD-PCM) packet, a G.723 packet, a USB packet, or an IEEE1394 frame. The transmission-side upper layer I/F 101 passes the received transmission packet to the stream recognition section 102.

The stream recognition section 102 refers to the stream recognition information contained in the transmission packet received from the transmission-side upper layer I/F 101, and extracts the stream number and the destination of the transmission packet. The retrieved stream number and destination are explicitly added to the transmission packet, and passed to the queue control section 103.

The queue control section 103 refers to the stream number and destination added to the transmission packet passed from the stream recognition section 102, and checks whether any one of the transmission queues 104, 105, 106, and 107 has stored therein a packet corresponding to the same stream type and the same destination as those added to the transmission packet. In the case where there is such a packet as to correspond to the same stream type and the same destination as those added to the transmission packet, the queue control section 103 stores the transmission packet into a transmission queue having stored therein the packet corresponding to the same stream type and the same destination as those added to the transmission packet. On the other hand, if there is no packet corresponding to the same stream type and the same destination as those added to the transmission packet, the queue control section 103 stores the transmission packet into an empty transmission queue. When storing the transmission packet into the empty transmission queue, the queue control section 103 reads the current time from the counter 112, and adds the read time to the transmission packet. In this manner, the queue control section 103 serves as a packet classification section for classifying packets by stream types and destinations, and accumulates the packets into the transmission queues.

The transmission control section 108 monitors the accumulation status of the transmission packets into the transmission queues. Specifically, the transmission control section 108 recognizes stream numbers accumulated in each transmission queue, and monitors, for each stream number, three conditions, such as whether the number of packets stored in the transmission queue exceeds the net maximum concatenation number Nb corresponding to the stream, whether a frame length, which is calculated based on the number of packets stored in the transmission queue, exceeds a default value obtained by the QoS control section 113 and corresponding to the stream, and whether a difference between the time at which the earliest transmission packet was stored and the current time obtained from the counter 112 is equal to or more than the net maximum delay time Tb corresponding to the stream. If any one of the above three conditions is satisfied, the transmission control section 108 retrieves all transmission packets stored in the transmission queue for which the condition is satisfied, and transmits all the retrieved transmission packets to the framing section 109.

The framing section 109 consolidates the transmission packets from the transmission control section 108 into one frame.

Figure 4:
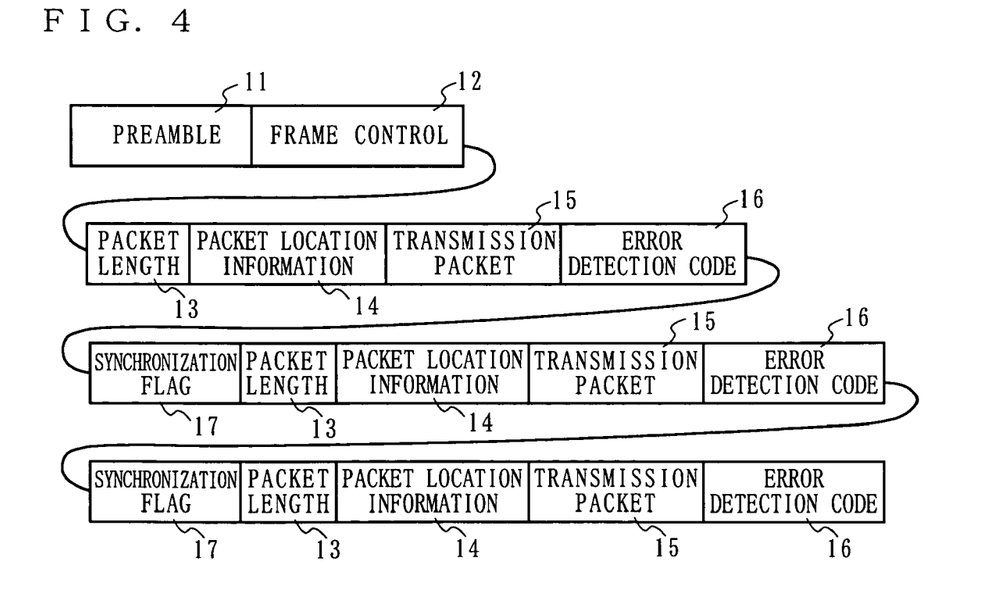
FIG. 4 is a diagram illustrating the structure of a frame generated by a framing section 109.

FIG. 4 is a diagram illustrating the structure of a frame generated by the framing section 109. As shown in FIG. 4, a single frame contains a preamble 11, a frame control 12, packet lengths 13 corresponding to transmission packets, packet location information 14, transmission packets 15, error detection codes 16, and synchronization flags 17. Each of the packet lengths 13, the packet location information 14, and the error detection codes 16 is provided for one transmission packet. A synchronization flag 17 is inserted immediately before each of the packet lengths 13 corresponding to second and subsequent transmission packets 15. The preamble 11 and the frame control 12 are added at the head of the frame. Each transmission packet 15 is added with the packet length 13, and the packet location information 14, which indicates the order of the transmission packet 15 counted from the head of the frame. Moreover, each transmission packet 15 is added at its end with the error detection code 16 used for detecting an error within a portion from the packet length 13 to the transmission packet 15. The synchronization flag 17 is added following the error detection code 16. Note that the packet length 13, the packet location information 14, and the error detection code 16 are repeatedly provided in the same number as the number of the transmission packets 15 contained in the frame, and the synchronization flag 17 is not added after the last error detection code 16 in the frame. Although FIG. 4 shows an example where a single frame contains three transmission packets, the number of transmission packets to be contained per frame is not limited to three. Note that the packet location information 14 added to the last transmission packet 15 is added with a value 0×80 in order to explicitly represent the end of the frame.

The framing section 109 passes a generated frame to the medium transmission section 110.

The medium transmission section 110 modulates the frame passed from the framing section 109, and transmits the modulated frame to the reception side communication terminal device via the communication medium.

In this manner, a frame containing transmission packets is transmitted from the transmission side communication terminal device to the reception side communication terminal device.

Described next is an operation of the reception side communication terminal device.

Referring to FIG. 3, the medium reception section 201 demodulates and passes a frame transmitted from the transmission side communication terminal device, to the packet reception processing section 202.

The packet reception processing section 202 extracts the first packet location information 14, the first transmission packet 15, and the first error detection code 16 from the frame based on the first packet length 13 contained in the frame. The packet reception processing section 202 uses the extracted error detection code 16 to check whether there is an error in the transmission packet 15. If there is no error, the packet reception processing section 202 notifies the retransmission control section 204 of the extracted packet location information 14, and passes the extracted transmission packet 15 to the reception-side upper layer I/F 203. The reception-side upper layer I/F 203 passes the transmission packet 15 to the upper layer. If there is an error in the transmission packet 15, the packet reception processing section 202 discards the packet location information 14 and the transmission packet 15 extracted from the frame.

Then, the packet reception processing section 202 seeks for a synchronization flag. If the synchronization flag is found, the packet reception processing section 202 extracts the second packet length 13, the second packet location information 14, the second transmission packet 15, and the second error detection code 16 which are all located after the synchronization flag, and determines whether there is an error in the second transmission packet 15 in a manner as described above. If there is no error, the packet reception processing section 202 notifies the retransmission control section 204 of the extracted packet location information 14, and passes the extracted transmission packet 15 to the reception-side upper layer I/F 203. The reception-side upper layer I/F 203 passes the transmission packet 15 to the upper layer. If there is an error in the second transmission packet 15, the packet reception processing section 202 discards the packet location information 14 and the second transmission packets 15. The packet reception section 202 repeatedly performs processing as described above until it encounters the end of the frame.

When the processing as described above is completed to the end of the frame, the packet reception processing section 202 notifies the retransmission control section 204 of the completion of the processing. Upon receipt of the notification, the retransmission control section 204 checks whether each piece of packet location information between the head and the tail of the frame corresponds to a packet notified as containing no error. Specifically, if the number of packets contained in the frame is N, the retransmission control section 204 checks whether the packet location information has been received in numerical order such that the last piece of packet location information is assigned with a number of N+0×80. If N pieces of packet location information have been received, the retransmission control section 204 passes a reception completion notification to the medium transmission section 205. In response to this, the medium transmission section 205 transmits the reception completion notification to the transmission side communication terminal device. If the number of received pieces of packet location information is less than N, the retransmission control section 204 passes to the medium transmission section 205 a retransmission request notification containing the packet location information corresponding to the transmission packets received without an error. In response to this, the medium transmission section 205 transmits the retransmission request notification to the transmission side communication terminal device.

In the transmission side communication terminal device, the medium reception section 111 receives an incoming reception completion notification or retransmission request notification. When the reception completion notification is received, the medium reception section 111 removes all transmitted packets in the transmission queues, thereby terminating a transmission process. When the retransmission request notification is received, the medium reception section 111 removes only packets notified as having been normally received, from the transmission queues, and requests the transmission control section 108 to retransmit a packet notified as having not been normally received. In response to this, the transmission control section 108 retransmits only the packet having been failed to be transmitted. Alternatively, the transmission control section 108 waits until a transmission packet is newly stored into the transmission queue, and then retransmits a frame constructed by concatenating the newly stored transmission packet and the packet having been failed to be transmitted.

In this manner, in the first embodiment of the present invention, the communication terminal device classifies packets by stream types and destinations, and accumulates the packets into the transmission queues. If the net maximum concatenation number Nb or the net maximum delay time Tb specified by the QoS parameter is satisfied in a transmission queue, packets accumulated in the transmission queue are concatenated into a frame and transmitted. Accordingly, it is possible to transmit the frame containing a maximum number of packets which can be concatenated, whereby it is possible to increase a transmission efficiency. Moreover, the upper limit of the number of packets to be concatenated (i.e., the net maximum concatenation number Nb) and the time allowed for a frame to reach the reception side after a previous frame reaches the reception side (i.e., the net maximum delay time Tb) are determined based on the QoS parameter defined for each stream, and therefore it is possible to satisfy the transmission start requirements. Accordingly, it is possible to provide a communication terminal device capable of increasing the transmission efficiency, while of satisfying the transmission quality requirements.

Further, it is possible to retransmit only a packet determined as having an error, i.e., selective packet retransmission is possible, whereby it is possible to increase throughput.

Note that the first embodiment has been described with respect to a case where the reception side communication terminal device detects an error in packets contained in a received frame, and requests the transmission side communication terminal device to retransmit packets determined as having an error. However, the reception side communication terminal device may request the transmission side communication terminal device to retransmit an earliest packet determined as having an error and all packets following the earliest packet.

Furthermore, the first embodiment has been described with respect to a case where the net maximum concatenation number Nb and the net maximum delay time Tb are assigned by the QoS control section 113. However, the net maximum concatenation number Nb and the net maximum delay time Tb may be assigned by the QoS controller in accordance with predetermined criteria.

Further still, although the first embodiment has been described with respect to a case where the QoS control section 113 determines a required bandwidth based on the QoS parameter, and notifies the QoS controller of the required bandwidth, the QoS control section 113 may notify the QoS parameter itself directly to the QoS controller.

Further still, the first embodiment has been described with respect to a case where a queue structure is used for temporarily accumulating packets. However, any means for simply accumulating packets can be used instead of using the queue structure so long as the order of transmitting packets is appropriately controlled.

Further still, the first embodiment has been described with respect to a case where the communication terminal devices are separately provided on the reception and transmission sides. However, it is apparent that a single communication terminal device can have both a transmission function and a reception function.

Further still, the first embodiment has been described with respect to a case where the maximum concatenation number and/or the maximum delay time are used as transmission start requirements. However, the present invention is not limited to this so long as the transmission quality is defined for each stream type.

(Second Embodiment)

In the case of a power line communication in which a power line is used as a communication medium, there is a possibility that a cyclic power noise in synchronization with a power line cycle (e.g., 50 Hz in eastern Japan, and 60 Hz in western Japan) might occur due to a device connected to a transmission line.

Figure 5:
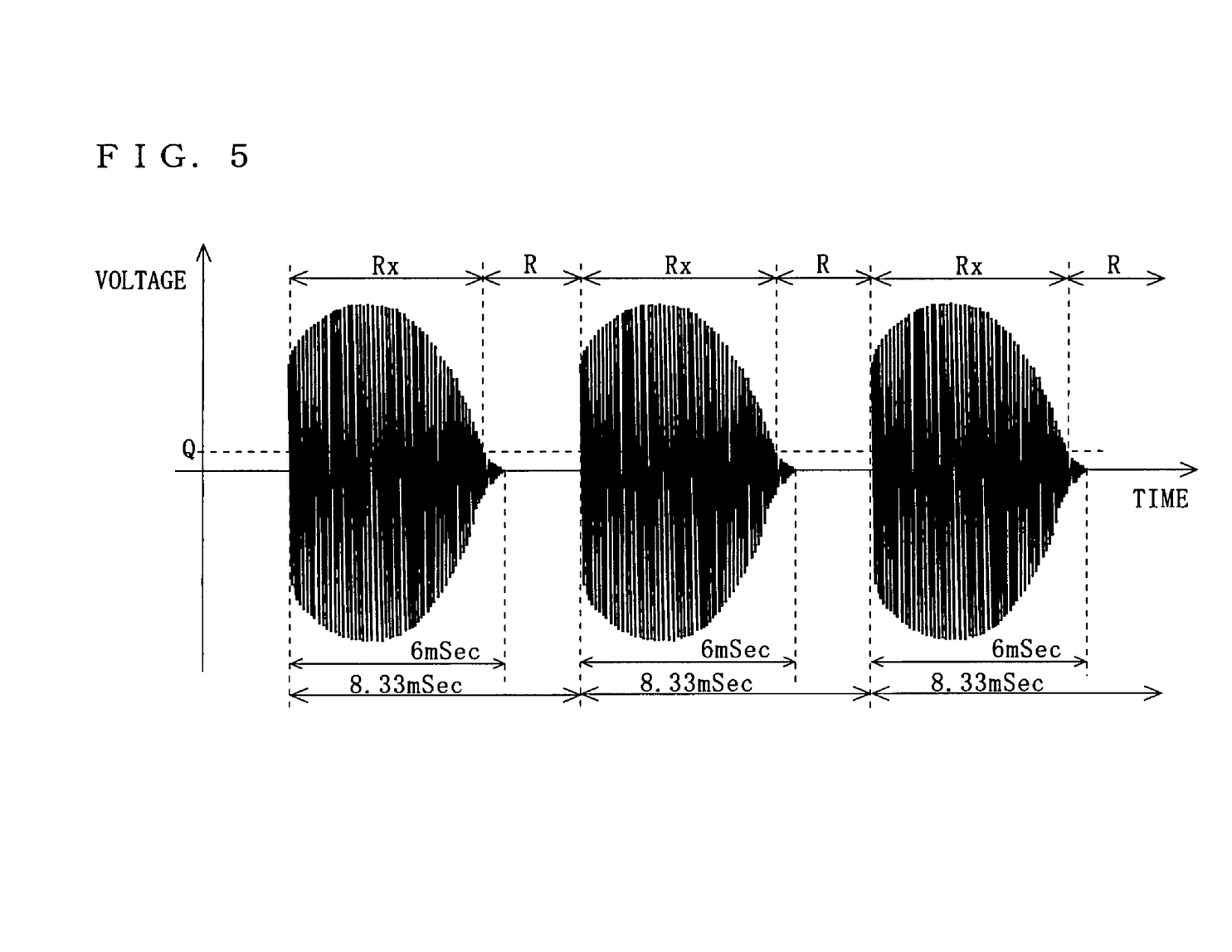
FIG. 5 is a graph showing an exemplary cyclic power noise observed on a power line when a halogen lamp is connected to a 60 Hz power source.

FIG. 5 is a graph showing an exemplary cyclic power noise observed on a power line when a halogen lamp is connected to a 60 Hz power source. In the cyclic power noise as shown in FIG. 5, voltage is increased and decreased over time in a cyclic manner. In FIG. 5, a six millisecond-long noise is exemplarily shown as cyclically occurring at 8.33 msec intervals (i.e., at each half a power line cycle).

If such a cyclic power noise occurs in the neighborhood of a receiving side terminal device, a signal-to-noise (SN) ratio declines in a period Rx where noise voltage exceeds a threshold Q. On the other hand, a satisfactory SN ratio is obtained in a period R where the noise voltage is equal to or less than the threshold Q. Accordingly, reception on the reception side is not possible in the period Rx. Therefore, in the case where the cyclic power noise as described above occurs, even if the number of concatenated packets is increased, packets which are not correctly reach the reception side might occur, failing to increase the transmission efficiency. A second embodiment is described in relation to a communication terminal device which is able to solve the problem as described above.

Figure 6:
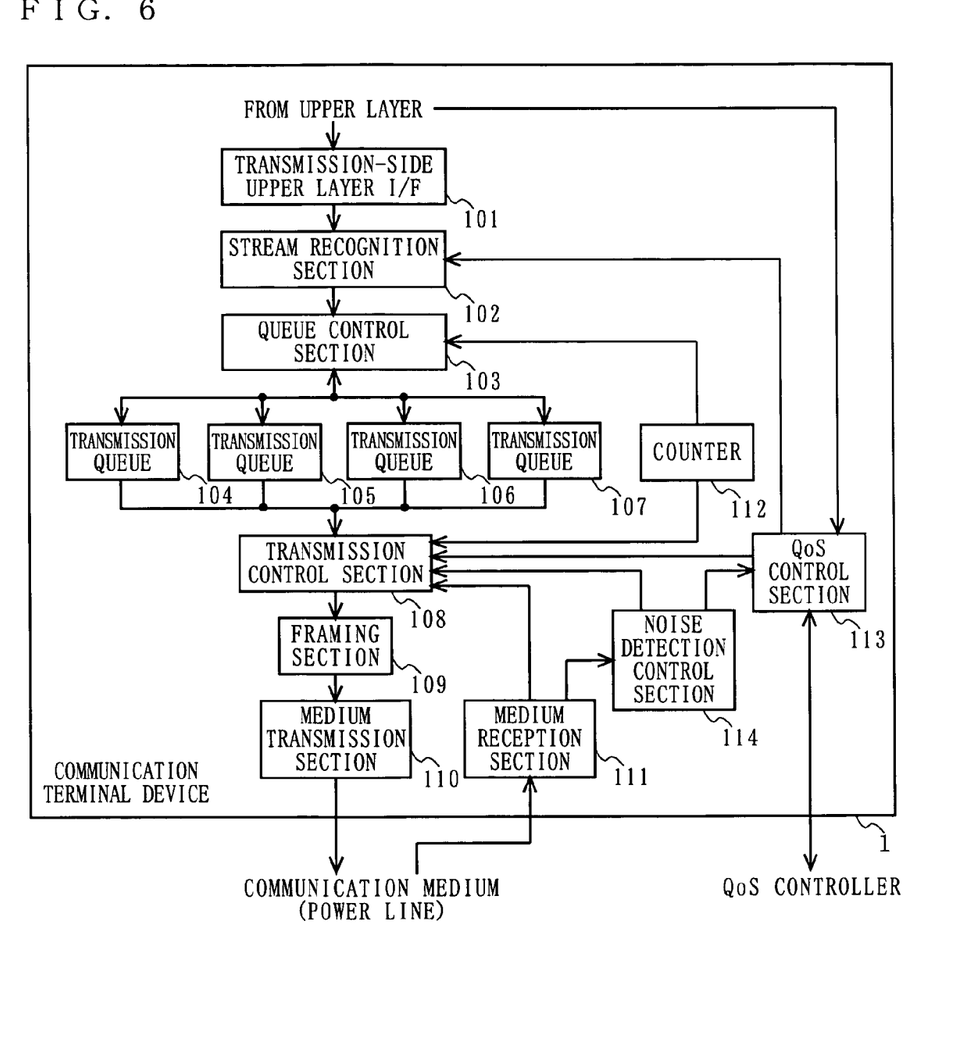
FIG. 6 is a block diagram illustrating a functional structure of a transmission side communication terminal device according to a second embodiment of the present invention.

FIG. 6 is a block diagram illustrating a functional structure of a transmission side communication terminal device according to the second embodiment of the present invention. In FIG. 6, elements similar to those of the transmission side communication terminal device according to the first embodiment are denoted by the same reference numerals, and detailed descriptions thereof are omitted. As shown in FIG. 6, the transmission side communication terminal device according to the second embodiment differs from the transmission side communication terminal device according to the first embodiment in that a noise detection control section 114 is newly added.

Figure 7:
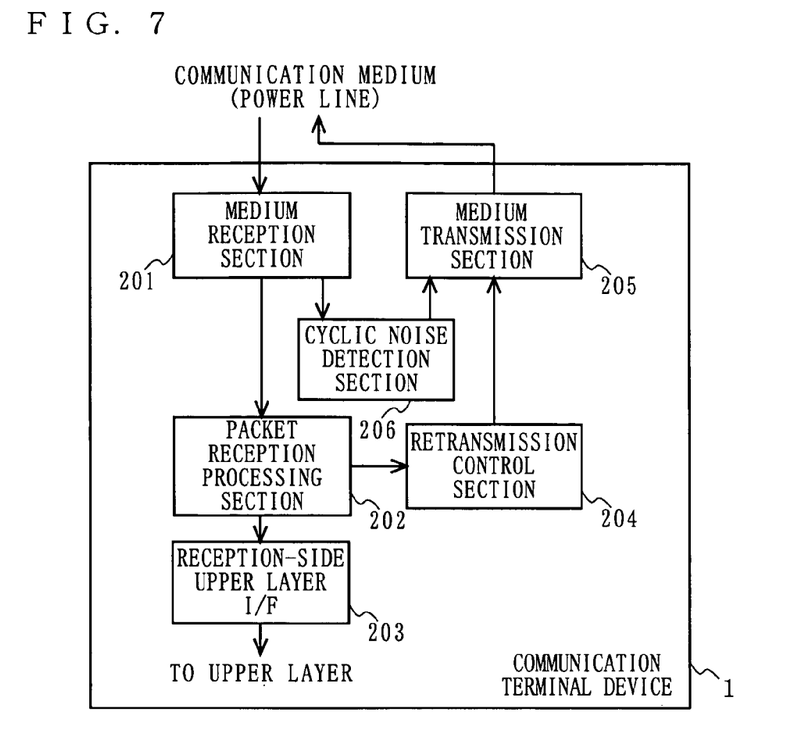
FIG. 7 is a block diagram illustrating a functional structure of a reception side communication terminal device according to the second embodiment of the present invention.

FIG. 7 is a block diagram illustrating a functional structure of a reception side communication terminal device according to the second embodiment of the present invention. In FIG. 7, elements similar to those of the reception side communication terminal device according to the first embodiment are denoted by the same reference numerals, and detailed descriptions thereof are omitted. As shown in FIG. 7, the reception side communication terminal device according to the second embodiment differs from the reception side communication terminal device according to the first embodiment in that a cyclic noise detection section 206 is newly added.

Described below is an operation of the communication terminal device according to the second embodiment.

The noise detection control section 114 determines whether a notification, which indicates that an error rate of received packets is equal to or more than a predetermined value, has been received from the reception side communication terminal device. If it is determined that the notification, which indicates that an error rate of received packets is equal to or more than a predetermined value, has been received, the noise detection control section 114 passes a noise detection request frame to a transmission control section 108, thereby causing the transmission control section 108 to transmit the noise detection request frame to the reception side communication terminal device. This starts a transmission side noise detection sequence. In the transmission side noise detection sequence, the transmission side communication terminal device continuously transmits short packets for evaluation. The transmission side communication terminal device suspends data packet transmission for a time period required for noise detection (i.e., a time period corresponding to half a power line cycle).

In the reception side communication terminal device having received the noise detection request frame, the cyclic noise detection section 206 starts a reception side noise detection sequence. In the reception side noise detection sequence, the cyclic noise detection section 206 detects an S/N ratio and an error rate from transmitted short packets for evaluation, thereby detecting a noise power level. Note that in the case where a communication terminal device other than a set of communication terminal devices implementing the noise detection sequence is present on the network, if the communication terminal device receives the noise detection request frame, the communication terminal device suspends its transmission operation for a time period required for noise detection (i.e., a time period corresponding to half a power line cycle).

The cyclic noise detection section 206 calculates a communication enabled period R (see FIG. 5) based on measurement data obtained by the reception side noise detection sequence, and notifies the calculated period to the transmission side communication terminal device via the medium transmission section 205.

Upon notification of the communication enabled period R, the noise detection control section 114 notifies the communication enabled period R to the QoS control section 113. The QoS control section 113 calculates (R−V)/W based on a redundant time V required for frame transmission and a period W required for transmitting data in a single packet, and thereafter calculates a maximum integer K which does not exceed (R−V)/W. If the net maximum concatenation number Nb of the stream to be transmitted to the communication terminal device having detected the cyclic power noise exceeds the integer K, the QoS control section 113 changes the net maximum concatenation number Nb to the integer K. Note that the redundant time V required for frame transmission is obtained by adding a time period corresponding to the preamble 11 to a time period corresponding to the frame control 12, and the period W required for transmitting data in a single packet is obtained by adding together a time period required for transmitting the packet length 13 corresponding to one transmission packet, a time period required for transmitting the packet location information 14, a time period required for transmitting the transmission packet 15, and a time period required for transmitting the error detection code 16. The QoS control section 113 requests the stream recognition section 102 to concatenate the number of packets corresponding to the changed net maximum concatenation number Nb, and also requests the transmission control section 108 to transmit packets concatenated during a communication enabled period.

As described above, in the second embodiment, the communication terminal device calculates the number of packets which can be transmitted during a communication enabled period under the circumstance where the cyclic power noise occurs, and sets the calculated number as the net maximum concatenation number Nb. Thereafter, the communication terminal device concatenates the number of packets corresponding to the net maximum concatenation number Nb, and transmits the concatenated packets during the communication enabled period. Accordingly, the communication terminal device ensures that a frame is transmitted such that packets reaches their destination under the circumstance where the cyclic power noise occurs. Therefore, it is possible to provide a communication terminal device which is able to maintain a satisfactory transmission efficiency even under the circumstance where the cyclic power noise occurs.

Note that the above-described embodiments also can be realized by causing a computer to implement a program which is able to cause the CPU to implement the above-described process procedures stored in a storage device (e.g., a ROM, a RAM, a hard disk, etc.). In such a case, the program may be implemented after it is stored into the storage device via a recording medium, or may be implemented directly from the recording medium. The term "recording medium" as described herein refers to a ROM, a RAM, a semiconductor memory, such as a flash memory, a magnetic disc memory, such as a flexible disc, a hard disk, etc., an optical disc, such as a CD-ROM, a DVD, or a blue-ray disc (BD), etc., or a memory card. The term "recording medium" as described herein also refers to a communication medium including a telephone line, a carrier path, etc.

Note that functional blocks shown in FIGS. 2, 3, 6, and 7 each may be realized as a large-scale integrated (LSI) circuit. Each of the functional blocks may be implemented as a single chip which includes a part or all of it. The LSI circuit may be selected from the group consisting of integrated circuits of various degrees of integration, e.g., an IC, a system LSI, a super LSI, an ultra LSI, etc. Further, a technique used for realizing circuit integration as described above is not limited to an LSI technique, and the integrated circuit as described above may be realized using a specialized circuit or a general-purpose processor. It is also possible to use a field programmable gate array (FPGA), which can be programmed after manufacture, or a reconfigurable processor which is structured such that connections of circuit cells thereof and its settings can be reconfigured. Furthermore, in the event of introduction of a new circuit integration technique, in place of the LSI technique, due to the advance of semiconductor technology or other relevant technologies, the above-described functional blocks may be integrated using such a new technique. It is conceivable that biotechnology or the like is applied to integration of the functional blocks.

Figure 8:
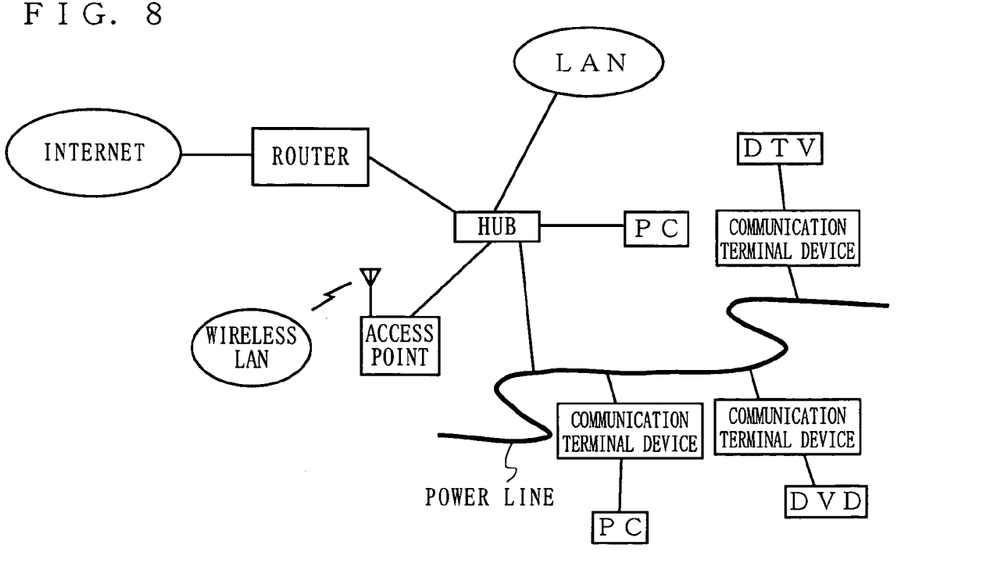
FIG. 8 is a diagram illustrating the entire system structure when a communication terminal device of the present invention is applied to high-speed power line transmission.

Described below is an example of applying the above embodiments to an actual network system. FIG. 8 is a diagram illustrating the entire system structure when the communication terminal device of the present invention is applied to high-speed power line transmission. As shown in FIG. 8, the communication terminal device of the present invention is provided as an interface between a multimedia apparatus, such as a digital television (DTV), a personal computer (PC), a DVD recorder, etc., and a power line. The multimedia apparatus may be connected to the communication terminal device of the present invention via an IEEE 1394 interface, a USB interface, or an Ethernet interface. With this structure, a communication network system is structured so as to transmit digital data, such as multimedia data, at high speed via the power line as a communication medium. Accordingly, unlike in the case of a conventional wired LAN, it is possible to use a power line previously installed at home, an office, etc., as a network line without providing a network cable anew. Therefore, convenience of such a system is considerably high with respect to cost and ease of installation.

In the example shown in FIG. 8, the communication terminal device of the present invention is provided as an adaptor for adapting a signal interface of an existing multimedia apparatus to a power line communication interface. However, the communication terminal device of the present invention may be included in a multimedia apparatus, such as a personal computer, a DVD recorder, a digital television, a home server system, etc. This allows data to be transmitted between multimedia apparatuses via their power cords. In this case, it is possible to eliminate a wire for connecting an adaptor to the power line, and an IEEE1394 cable or a USB cable, thereby simplifying system wiring.

Further, in a communication network system using the power line, connection to the Internet, a wireless LAN, or a conventional wired LAN can be made via a router and/or a hub, and therefore there is no difficulty in extending a LAN system which employs the communication network system of the present invention.

Furthermore, communication data transmitted through the power line via power line transmission is not intercepted unless interception is conducted via direct connection to the power line, and therefore there is substantially no data leakage by interception which is a disadvantage of a wireless LAN. Accordingly, the power line transmission is advantageous from the viewpoint of security. It goes without saying that the data transmitted through the power line can be protected by employing security architecture for internet protocol (IPsec), encrypting content itself, or employing other digital rights management (DRM) techniques.

As described above, by implementing a copyright protection function using content encryption or a QoS function including a data loss prevention function for preventing data loss due to packet discard, which is achieved by the present invention, it is made possible to implement high-quality AV content transmission via the power line.

The present invention provides a communication terminal device, a method, a program, a recording medium, and an integrated circuit which can increase a transmission efficiency, while satisfying transmission quality requirements, and therefore is advantageous when applied to a communication network system for transmitting/receiving a frame containing a plurality of packets.

While the invention has been described in detail, the foregoing description is in all aspects illustrative and not restrictive. It is understood that numerous other modifications and variations can be devised without departing from the scope of the invention.

What is claimed is:

1. A communication terminal device for generating a frame by concatenating a plurality of packets obtained from streams, and for transmitting the generated frame, the device comprising:

a packet classification section for classifying the packets by stream types and destinations;

a packet accumulation section for accumulating the packets classified by the packet classification section, so as to be separately stored based on classification by the stream types and the destinations;

a QoS control section for determining a transmission start requirement of at least one packet stored in the packet accumulation section based on a QoS parameter which defines a transmission quality of a stream;

a transmission control section for determining whether the transmission start requirement is satisfied;

a framing section for generating the frame by concatenating the packets accumulated in the packet accumulation section if it is determined by the transmission control section that the transmission start requirement of the at least one packet is satisfied; and a transmission section for transmitting the frame generated by the framing section to a destination communication terminal device.

2. The communication terminal device according to claim 1, wherein the QoS parameter is any one of a maximum tolerable delay time, a maximum tolerable jitter, a maximum transmission rate, a minimum transmission rate, a maximum continuous transmission time, and a maximum transmission suspension time.

3. The communication terminal device according to claim 1, further comprising:

a reception section for receiving a frame transmitted from a different communication terminal device;

an error detection section for detecting errors in packets contained in the frame received by the reception section; and a retransmission request section for requesting the different communication terminal device to retransmit an earliest packet determined by the error detection section as having an error and all packets following the earliest packet.

4. The communication terminal device according to claim 3, wherein the framing section is operable to add to each packet an error detection code, location information about a location of the packet in the frame, and a synchronization flag.

5. The communication terminal device according to claim 1, further comprising:

a reception section for receiving a frame transmitted from a different communication terminal device;

an error detection section for detecting errors in packets contained in the frame received by the reception section; and a retransmission request section for requesting the different communication terminal device to retransmit any packet determined by the error detection section as having an error.

6. The communication terminal device according to claim 5, wherein the framing section is operable to add to each packet an error detection code, location information about a location of the packet in the frame, and a synchronization flag.

7. The communication terminal device according to claim 1, wherein the packets are Ethernet (R) frames.

8. The communication terminal device according to claim 1, wherein the packets are MPEG-TS packets.

9. The communication terminal device according to claim 1, wherein:

the QoS control section is operable to calculate a maximum concatenation number of packets and operable to determine the transmission start requirement based on the maximum concatenation number, and the transmission control section is operable to determine that the transmission start requirement is satisfied when the number of packets accumulated in the packet accumulation section exceeds the maximum concatenation number.

10. The communication terminal device according to claim 9, further comprising a maximum concatenation number change section for changing the maximum concatenation number, wherein the transmission section is operable to transmit the frame over a power line, and wherein if a cyclic power noise occurs on the power line, the maximum concatenation number change section changes the maximum concatenation number to a number of packets which can be transmitted within a time period in which a quantity of the cyclic power noise is less than a predetermined value.

11. The communication terminal device according to claim 10, wherein in a case where the maximum concatenation number is N, the time period in which the quantity of the cyclic power noise is less than the predetermined value is R, a redundant time period, which is obtained by excluding a time period of data from a total time period required for transmitting one frame, is V, and a time period, which corresponds to a portion of a transmission frame and is required for transmitting data corresponding to a single packet, is W, the maximum concatenation number change section is operable to set the maximum concatenation number so as to be a value equal to or less than a maximum integer which does not exceed $(R-V)/W$.

12. The communication terminal device according to claim 9, wherein the transmission in section is operable to transmit the frame over a transmission line, and the QoS control section is operable to calculate the maximum concatenation number based on the QoS parameter and a status of the transmission line.

13. The communication terminal device according to claim 9, wherein the transmission section is operable to transmit the frame over a transmission line, and the maximum concatenation number is calculated by an external QoS controller based on the QoS parameter and a status of the transmission line.

14. The communication terminal device according to claim 1, wherein:

the QoS control section is operable to calculate a maximum delay time and operable to determine the transmission start requirement based on the maximum delay time, and the transmission control section is operable to determine that the transmission start requirement is satisfied when a difference between a time at which an earliest transmission packet was stored and a current time is equal to or greater than the maximum delay time.

15. The communication terminal device according to claim 14, further comprising a counter which indicates a current time, wherein the packet accumulation section is operable to add the current time indicated by the counter to each packet to be accumulated, and wherein the transmission control section is operable to determine whether a difference between the current time indicated by the counter and a time added to an earliest packet accumulated in the packet accumulation section exceeds the maximum delay time, so as to determine whether the packets are accumulated into the packet accumulation section within the maximum delay time.

16. The communication terminal device according to claim 14, wherein the transmission section is operable to transmit the frame over a transmission line, and the QoS control section is operable to calculate the maximum delay time based on the QoS parameter and a status of the transmission line.

17. The communication terminal device according to claim 14, wherein the transmission section is operable to transmit the frame over a transmission line, and the maximum delay time is calculated by an external QoS controller based on the QoS parameter and a status of the transmission line.

18. A method for generating a frame by concatenating a plurality of packets obtained from streams, and for transmitting the generated frame, the method comprising:
classifying the packets by stream types and destinations;
accumulating the classified packets so as to be separately stored based on classification by the stream types and the destinations;
determining a transmission start requirement of at least one of the accumulated packets based on a QoS parameter which defines a transmission quality of a stream;
determining whether the transmission start requirement is satisfied;
generating the frame by concatenating the accumulated packets if it is determined that the transmission start requirement of the at least one accumulated packet is satisfied; and
transmitting the generated frame to its destination.

19. A computer-readable recording medium having stored therein a program causing a computer to generate a frame by concatenating a plurality of packets obtained from streams, and to transmit the generated frame,
the program causing the computer to implement:
classifying the packets by stream types and destinations;
accumulating the classified packets so as to be separately stored based on classification by the stream types and the destinations;
determining a transmission start requirement of at least one of the accumulated packets based on a QoS parameter which defines a transmission quality of a stream;
determining whether the transmission start requirement is satisfied;
generating the frame by concatenating the accumulated packets if it is determined that the transmission start requirement of the at least one accumulated packet is satisfied; and
transmitting the generated frame to its destination.

20. An integrated circuit for generating a frame by concatenating a plurality of packets obtained from streams, the circuit comprising:
a packet classification section for classifying the packets by stream types and destinations;
a packet accumulation section for accumulating the packets classified by the packet classification section, so as to be separately stored based on classification by the stream types and the destinations;
a QoS control section for determining a transmission start requirement of at least one packet stored in the packet accumulation section based on a QoS parameter which defines a transmission quality of a stream;
a transmission control section for determining whether the transmission start requirement is satisfied; and
a framing section for generating the frame by concatenating the packets accumulated in the packet accumulation section if it is determined by the transmission control section that the transmission start requirement of the at least one packet is satisfied.

* * * * *